United States Patent
Lee et al.

(10) Patent No.: US 7,961,275 B2
(45) Date of Patent: Jun. 14, 2011

(54) IN-PLANE SWITCHING LIQUID CRYSTAL DISPLAY DEVICE AND METHOD OF FABRICATING THE SAME

(75) Inventors: Joun-Ho Lee, Daegu (KR); Gi-Dong Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 888 days.

(21) Appl. No.: 11/370,987

(22) Filed: Mar. 9, 2006

(65) Prior Publication Data

US 2007/0002231 A1  Jan. 4, 2007

(30) Foreign Application Priority Data

Jun. 30, 2005  (KR) .................. 10-2005-0057876
Jun. 30, 2005  (KR) .................. 10-2005-0057901
Mar. 2, 2006   (KR) .................. 10-2006-0020037

(51) Int. Cl.
  *G02F 1/1335* (2006.01)
(52) U.S. Cl. .......... 349/96; 349/138; 349/117; 349/118; 349/141
(58) Field of Classification Search ............. 349/96, 349/117, 118, 119, 141, 138
  See application file for complete search history.

(56) References Cited

U.S. PATENT DOCUMENTS

| | | | | |
|---|---|---|---|---|
| 5,793,455 A | * | 8/1998 | Nakamura | 349/96 |
| 6,115,095 A | * | 9/2000 | Suzuki et al. | 349/141 |
| 6,320,042 B1 | * | 11/2001 | Michihata et al. | 536/69 |
| 7,006,184 B2 | * | 2/2006 | Mi et al. | 349/130 |
| 7,227,602 B2 | * | 6/2007 | Jeon et al. | 349/119 |
| 7,460,198 B2 | * | 12/2008 | Nagai et al. | 349/117 |

FOREIGN PATENT DOCUMENTS

| | | |
|---|---|---|
| JP | 10-307291 | 11/1998 |
| JP | 11-133408 | 5/1999 |
| JP | 2001-228329 A | 8/2001 |
| JP | 2005154764 A | 6/2005 |
| WO | WO 2004/042461 A1 | 5/2004 |
| WO | WO 2005/038517 A1 | 4/2005 |

OTHER PUBLICATIONS

"NWF Series", Polarizing film with viewing angle compensation film, Mar. 18, 2005, 2 pages, Nitto Denko Corporation.

* cited by examiner

*Primary Examiner* — Thoi V Duong
(74) *Attorney, Agent, or Firm* — Morgan, Lewis & Bockius LLP

(57) ABSTRACT

An in-plane switching liquid crystal display device includes a liquid crystal display panel having first and second substrates, a first polarizer disposed at a first surface of the liquid crystal display panel and having a first protective film, a first polarizing film, and a second protective film, a second polarizer disposed at a second surface of the liquid crystal display panel and having a third protective film, a second polarizing film, and a fourth protective film, and a first optical compensation film between the first polarizer and the liquid crystal display panel, the third protective film being adjacent to the liquid crystal display panel and having a substantially zero retardation value.

42 Claims, 7 Drawing Sheets

IN-PLANE SWITCHING LIQUID CRYSTAL DISPLAY DEVICE AND METHOD OF FABRICATING THE SAME

The present invention claims the benefit of Korean Patent Application Nos. 2005-0057876 and 2005-0057901 both filed on Jun. 30, 2005 and 2006-0020037 filed on Mar. 2, 2006, which are hereby incorporated by reference in their entirety.

BACKGROUND OF THE INVENTION

1. Field of the Invention

The present invention relates to a liquid crystal display (LCD) device. More particularly, the present invention relates to an in-plane switching liquid crystal display (IPS-LCD) device and a method of fabricating the same.

2. Discussion of the Related Art

In general, a liquid crystal display (LCD) device includes two substrates, which are spaced apart and face each other, and a liquid crystal layer interposed between the two substrates. Electrodes are formed on the both substrates and face each other. A voltage is applied to each of the electrodes, and an electric field is induced between the electrodes. An arrangement of liquid crystal molecules is changed by varying the intensity of the electric field, and the transmittance of light is varied due to the arrangement of the liquid crystal molecules. Thus, by properly controlling the applied electric field, an image can be produced.

Of the different types of known liquid crystal display (LCD) devices, twisted nematic (TN) liquid crystal display devices are widely used. In a TN LCD device, liquid crystal molecules are parallel to two substrates and are arranged to be twisted between the two substrates, so that the liquid crystal molecules adjacent to the two substrates are perpendicular to each other. The liquid crystal molecules are driven by an electric field, which is induced between a pixel electrode of a lower substrate and a common electrode of an upper substrate. The electric filed is applied to be perpendicular to the upper and lower substrates. When a voltage is not applied, the liquid crystal molecules are arranged parallel to the substrates. On the other hand, when a voltage is applied, the liquid crystal molecules are arranged perpendicular to the substrates. However, the TN LCD devices provide a narrow viewing angle because of the longitudinal electric field. In order to solve such a problem, in-plane switching liquid crystal display (IPS-LCD) devices have been proposed. In the IPS-LCD device, both a pixel electrode and a common electrode are configured to be formed on the same substrate.

FIG. 1 is a cross-sectional view illustrating an IPS-LCD device according to the related art. As shown in FIG. 1, a lower substrate 10 and an upper substrate 20 are spaced apart from each other. A thin film transistor T, which includes a gate electrode, a semiconductor layer, a source electrode and a drain electrode, is formed on an inner surface of the lower substrate 10. A common electrode 12 and a pixel electrode 14 are formed on the inner surface of the lower substrate 10 in a pixel region and are spaced apart from each other. Although not shown in the figure, the common electrode 12 and the pixel electrode 14 are parallel to each other, and the pixel electrode 14 is electrically connected to the drain electrode of the thin film transistor T. A passivation layer 16 covers the thin film transistor T, the common electrode 12 and the pixel electrode 14.

The common electrode 12 and the pixel electrode 14 are formed of different layers, and the common electrode 12 and the pixel electrode 14 may be formed of the same layer. In addition, the pixel electrode 14 is formed of the same layer as the source and drain electrodes of the thin film transistor T as shown in FIG. 1. The pixel electrode 14 may be formed on the passivation layer 16.

A black matrix 22 is formed on an inner surface of the upper substrate 20, and the black matrix 22 has an opening corresponding to the pixel region. A color filter layer 24 is formed on the inner surface of the upper substrate 20 and corresponds to the opening of the black matrix 22. The black matrix 22 also corresponds to the thin film transistor T to prevent photo leakage currents in the thin film transistor T and blocks the light in a region excluding the pixel region. The color filter layer 24 includes red, green and blue color filters, and each color filter corresponds to the pixel region. The color filter layer 24 partly covers the black matrix 22, and thus the borderline between adjacent color filters is disposed on the black matrix 22.

An overcoat layer 26 is formed on the color filter layer 24. The overcoat layer 26 protects the color filter layer 24 and prevents a material of the color filter layer 24 from gushing out. The overcoat layer 26 also flattens the surface of the upper substrate 20 including the color filter layer 24.

A liquid crystal layer 30 is interposed between the lower substrate 10 and the upper substrate 20. Liquid crystal molecules of the liquid crystal layer 30 are arranged parallel to the lower and upper substrates 10 and 30. Although not shown in the figure, alignment layers are formed on the lower and upper substrates 10 and 30 adjacent to the liquid crystal layer 30. The alignment layers are arranged by a rubbing method, for example, and determine an initial arrangement direction of the liquid crystal molecules.

Lower and upper polarizers 40 and 50 are disposed at outer surfaces of the lower and upper substrates 10 and 20, respectively. A light transmissive axis of the lower polarizer 40 is perpendicular to a light transmissive axis of the upper polarizer 50.

In the IPS-LCD device, when a voltage is applied to the common electrode 12 and the pixel electrode 14, an electric field parallel with the substrates 10 and 20 is induced between the electrodes 12 and 14. Then, the liquid crystal molecules of the liquid crystal layer 30 are arranged to be parallel with the electric field and perpendicular to the electrodes 12 and 14.

As described above, the pixel electrode and the common electrode in the IPS-LCD device are formed on the same substrate, and a horizontal electric field parallel with the substrate is induced between the electrodes. In turn, the liquid crystal molecules are arranged to be parallel to the horizontal electric field, to thereby increase viewing angles of the LCD device. However, there may be a light leakage in the IPS-LCD device when a black state is formed, and thus a contrast ratio is lowered.

FIG. 2 is a view illustrating simulations of contrast ratios of a related art IPS-LCD device in a black state. Here, a light transmissive axis of a lower polarizer is parallel to a length of a liquid crystal panel and corresponds to the x-axis in FIG. 2, and a light transmissive axis of an upper polarizer is parallel to a width of the liquid crystal panel and corresponds to the y-axis in FIG. 2. In addition, an optical axis of a liquid crystal layer is parallel to the light transmissive axis of the upper polarizer. As shown in FIG. 2, there are light leakages at angles of about 45 degrees, 135 degrees, 225 degrees and 315 degrees, which are diagonal directions of the liquid crystal panel, in the black state, and the brightness of the IPS-LCD device is increased. Accordingly, the contrast ratio of the IPS-LCD device is lowered. This problem occurs due to the polarizers.

FIG. 3 is a cross-sectional view schematically illustrating a related art polarizer. As shown in FIG. 3, the related art polarizer 70 includes first and second protective films 74a and 74b and a polarizing film 72 between the first and second protective films 74a and 74b. In general, the polarizing film 72 is formed of polyvinyl alcohol (PVA), and the first and second protective films 74a and 74b is formed of triacetyl cellulose (TAC).

The polarizer 70 of FIG. 3 may be attached to either upper or lower surface of a liquid crystal panel by using an adhesive layer. Here, the protective films adjacent to the liquid crystal panel may have phase retardation, and may include a –C plate (negative C plate), in which $n_x = n_y > n_z$, wherein $n_x$ is a first refractive index according to x-direction, $n_y$ is a second refractive index according to y-direction, $n_z$ is a third refractive index according to z-direction.

A polarizer is classified into O-type and E-type, and the O-type polarizer is widely used because the O-type polarizer has more properties in the black state as compared with the E-type polarizer.

When two O-type polarizers are arranged such that light transmissive axes are perpendicular to each other, a light transmittance is determined by the following equation:

$$T = \frac{1}{2}\left|\vec{O_1} \cdot \vec{O_2}\right|^2$$
$$= \frac{1}{8}\frac{\sin^2 2\phi \sin^4 \theta}{(1 - \cos^2\phi \sin^2\theta)(1 - \sin^2\phi \sin^2\theta)},$$

wherein $\vec{O_1}$ and $\vec{O_2}$ are vectors illustrating polarizing directions of the polarizers, and $\phi$ and $\theta$ are directions of a viewing angle. In FIG. 4, $\phi$ and $\theta$ are defined as an azimuthal angle and a polar angle in xyz polar coordinates, respectively.

FIG. 5 illustrates light transmittances of orthogonal polarizers resulting from the above equation according to an azimuthal angle $\phi$ and a polar angle $\theta$. As shown in FIG. 5, there is a light leakage around the polar angle $\theta$ of about 70 degrees, and the light leakage may be maximized at the azimuthal angle $\phi$ of about 45 degrees.

FIG. 6 is a view illustrating simulations of contrast ratios of the orthogonal polarizers in a black state using the above results. As shown in FIG. 6, there are light leakages at angles of about 45 degrees, 135 degrees, 225 degrees and 315 degrees. This is because orthogonality of the polarizers is broken according to viewing angles even if the light transmissive axes of the polarizers are perpendicular to each other.

As stated above, the light leakage increases the brightness of the IPS-LCD device in the black state, and thus the contrast ratio is lowered.

SUMMARY OF THE INVENTION

Accordingly, the present invention is directed to an in-plane switching liquid crystal display device and a method of fabricating the same that substantially obviate one or more problems due to limitations and disadvantages of the related art.

An object of the present invention is to provide an in-plane switching liquid crystal display device and a method of fabricating the same in which a light leakage is prevented in a black state and a contrast ratio is improved.

Another object of the present invention is to provide an in-plane switching liquid crystal display device and a method of fabricating the same, so that the LCD device has less color shift and an improved viewing angle.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of embodiments of the present invention, as embodied and broadly described, an in-plane switching liquid crystal display device includes a liquid crystal display panel having first and second substrates, a first polarizer disposed at a first surface of the liquid crystal display panel and having a first protective film, a first polarizing film, and a second protective film, a second polarizer disposed at a second surface of the liquid crystal display panel and having a third protective film, a second polarizing film, and a fourth protective film, and a first optical compensation film between the first polarizer and the liquid crystal display panel, the third protective film being adjacent to the liquid crystal display panel and having a substantially zero retardation value.

In another aspect of an embodiment, an in-plane switching liquid crystal display device includes a liquid crystal display panel having first and second substrates and a liquid crystal layer, a first polarizer disposed at a first surface of the liquid crystal display panel and having a first protective film, a first polarizing film, and a second protective film, a second polarizer disposed at a second surface of the liquid crystal display panel having a third protective film, a second polarizing film, and a fourth protective film, a first optical compensation film between the liquid crystal display panel and the second polarizer, and a second optical compensation film between the first optical compensation film and the second polarizer, the third protective film being adjacent to the liquid crystal display panel and having a substantially zero retardation value.

In another aspect of an embodiment, a method of fabricating an in-plane switching liquid crystal display device includes forming a liquid crystal display panel having first and second substrates, forming a first polarizer at a first surface of the liquid crystal display panel, the first polarizer having a first protective film, a first polarizing film, and a second protective film, forming a second polarizer at a second surface of the liquid crystal display panel, the second polarizer having a third protective film, a second polarizing film, and a fourth protective film, and forming a first optical compensation film between the first polarizer and the liquid crystal display panel, the third protective film being adjacent to the liquid crystal display panel and having a substantially zero retardation value.

In a further aspect of an embodiment, a method of fabricating an in-plane switching liquid crystal display device includes forming a liquid crystal display panel having first and second substrates and a liquid crystal layer, forming a first polarizer at a first surface of the liquid crystal display panel, the first polarizer having a first protective film, a first polarizing film, and a second protective film, forming a second polarizer at a second surface of the liquid crystal display panel, the second polarizer having a third protective film, a second polarizing film, and a fourth protective film, a first optical compensation film between the liquid crystal display panel and the second polarizer, and forming a second optical compensation film between the first optical compensation film and the second polarizer, the third protective film being adjacent to the liquid crystal display panel and having a substantially zero retardation value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
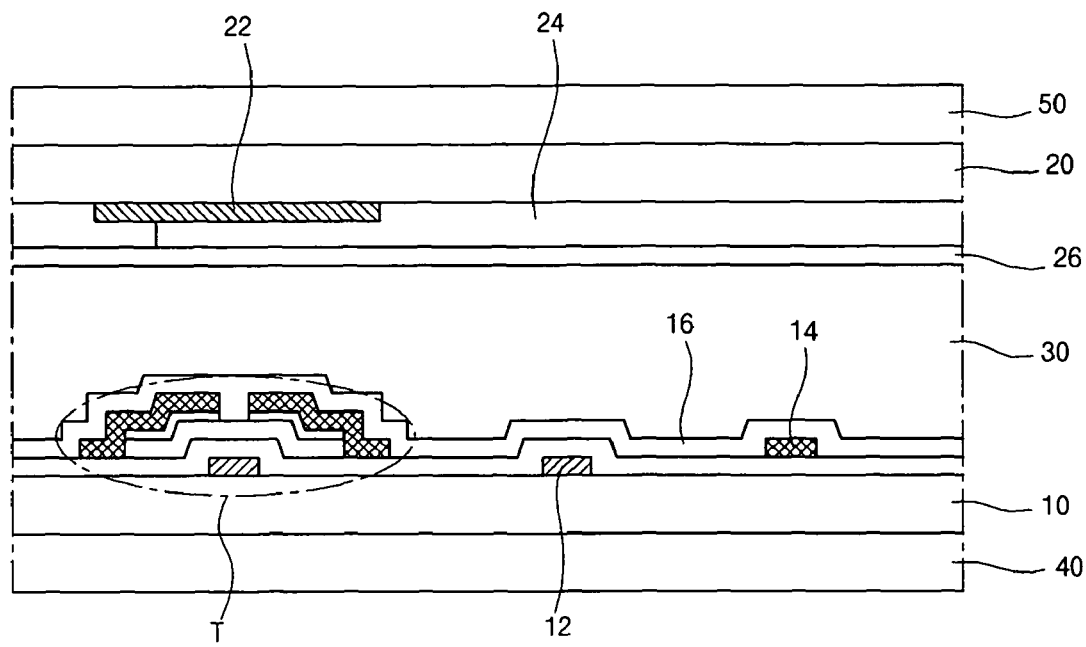
FIG. 1 is a cross-sectional view illustrating an IPS-LCD device according to the related art.
Figure 2:
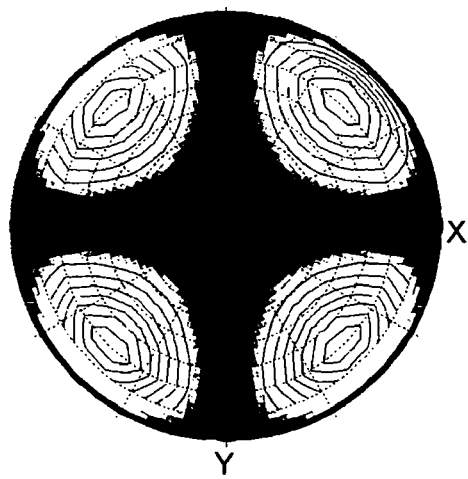
FIG. 2 is a view illustrating simulations of contrast ratios of the related art IPS-LCD device in a black state.
Figure 3:
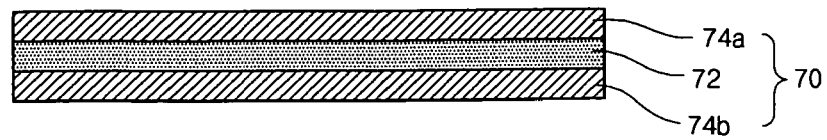
FIG. 3 is a cross-sectional view schematically illustrating a related art polarizer.
Figure 4:
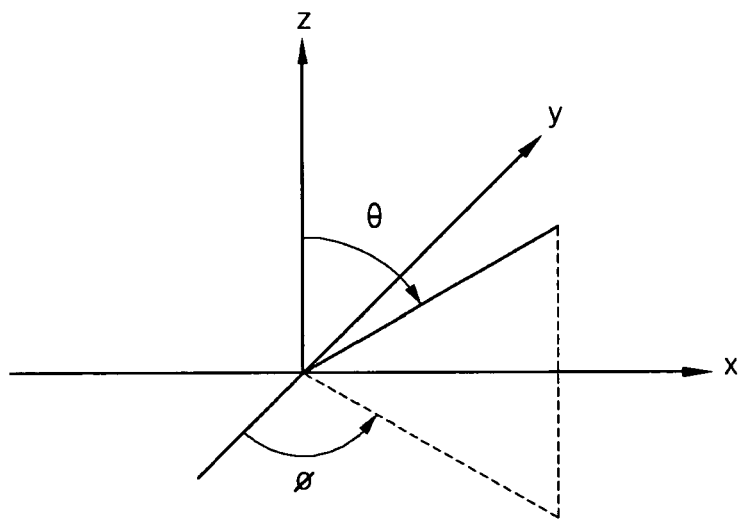
FIG. 4 is a view illustrating an azimuthal angle and a polar angle in xyz polar coordinates.
Figure 5:
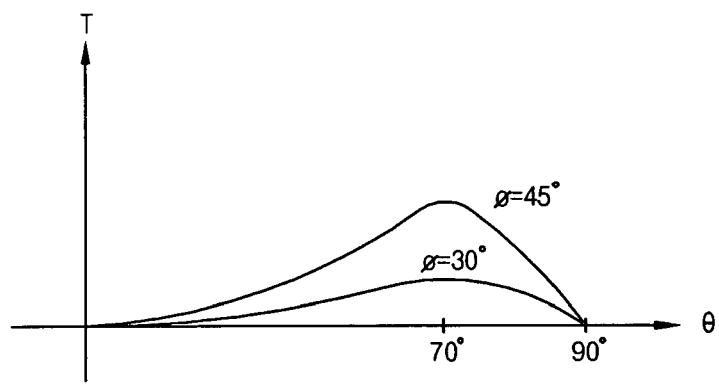
FIG. 5 is a view illustrating light transmittances of orthogonal polarizers according to an azimuthal angle and a polar angle.
Figure 6:
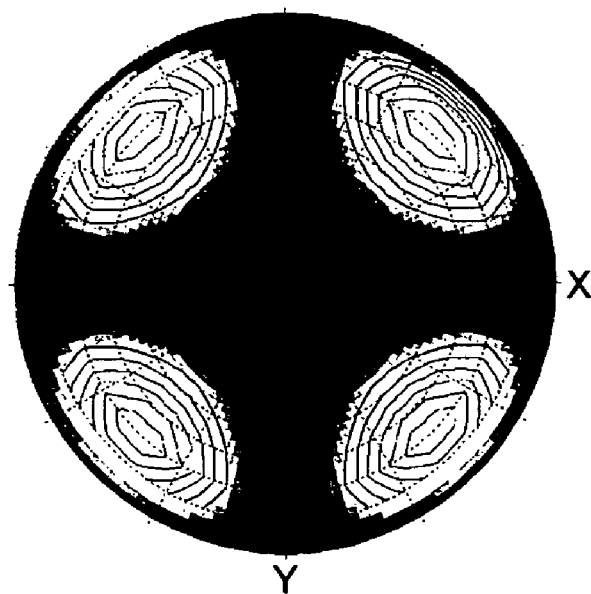
FIG. 6 is a view illustrating simulations of contrast ratios of the orthogonal polarizers in a black state.
Figure 7:
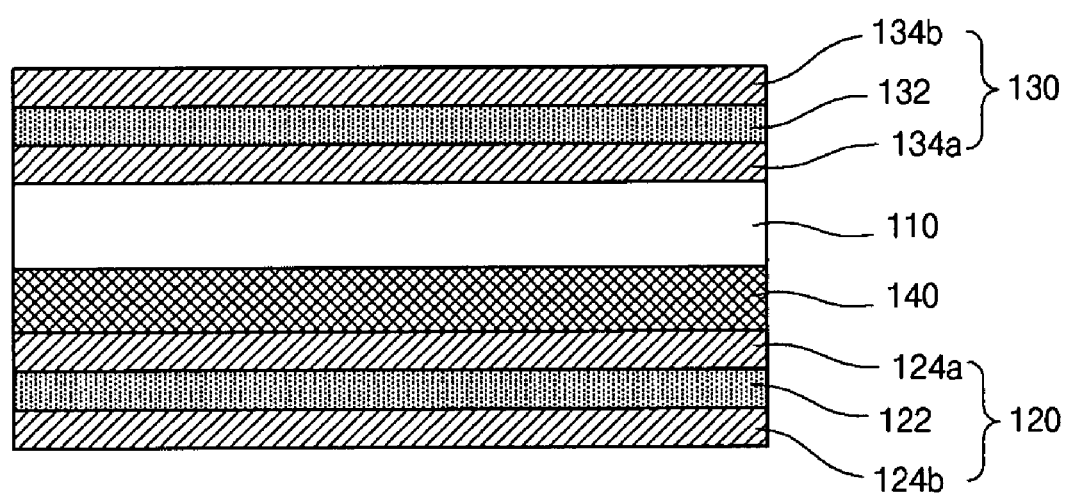
FIG. 7 is a cross-sectional view illustrating an IPS-LCD device according to a first embodiment of the present invention.

FIG. 7 is a cross-sectional view illustrating an IPS-LCD device according to a first embodiment of the present invention. In FIG. 7, the IPS-LCD device includes a liquid crystal panel 110, a first polarizer 120 at a lower surface of the liquid crystal panel 110, and a second polarizer 130 at an upper surface of the liquid crystal panel 110. An optical compensation film 140 is disposed between the first polarizer 120 and the liquid crystal panel 110.

Although not shown in the FIG. 7, the liquid crystal panel 110 further includes a first substrate, a second substrate, and a liquid crystal layer interposed between the first and second substrates. The liquid crystal panel 110 is operated in an in-plane switching mode, in which a thin film transistor, a common electrode and a pixel electrode are formed on an inner surface of the first substrate, and a black matrix and a color filter layer are formed on an inner surface of the second substrate. An overcoat layer may be further formed on the inner surface of the second substrate and cover the black matrix and the color filter layer.

As shown in the figure, the first polarizer 120 further includes first and second protective films 124a and 124b and a first polarizing film 122 between the first and second protective films 124a and 124b. Similarly, the second polarizer 130 further includes third and fourth protective films 134a and 134b and a second polarizing film 132 between the third and fourth protective films 134a and 134b. Here, the first and second polarizing films 122 and 132 may be formed of polyvinyl alcohol (PVA), and the first, second, third and fourth polarizing films 124a, 124b, 134a and 134b may be formed of triacetylcellulose (TAC). The first and third protective films 124a and 134a adjacent to the liquid crystal panel 110 may be formed of a material having a retardation value of about zero ranging from −10 nanometer to +10 nanometer.

The optical compensation film 140 may include a +C plate (positive C plate), in which $n_x=n_y<n_z$, wherein $n_x$ is a first refractive index according to the x-direction, $n_y$ is a second refractive index according to the y-direction, $n_z$ is a third refractive index according to the z-direction. The optical compensation film 140 may have a retardation value less than or equal to $\lambda/2$, wherein $\lambda$ is a wavelength of visible light. The +C plate may be formed by a coating or drawing method.

In the first embodiment of the present invention, the first protective film 124a may have a retardation value of a −C plate. When the first protective film 124a has a retardation value, a retardation value of the optical compensation film 140 depends on the retardation value of the first protective film 124a.

Figure 8:
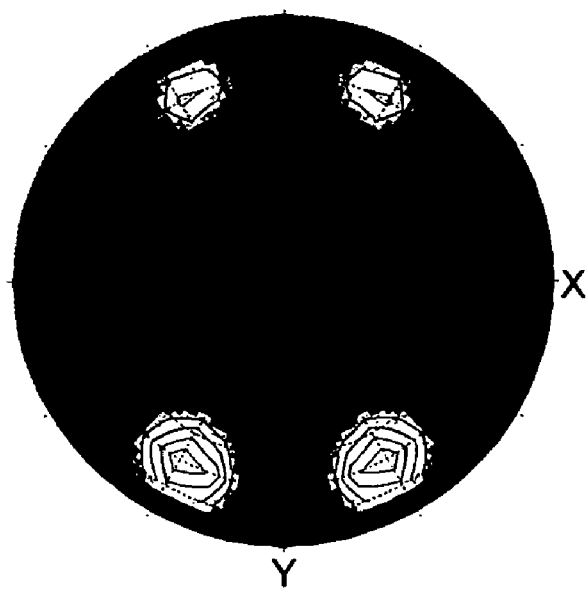
FIG. 8 is a view illustrating simulations of contrast ratios of an IPS-LCD device in a black state according to the first embodiment of the present invention.

FIG. 8 illustrates simulations of contrast ratios of an IPS-LCD device in a black state according to the first embodiment of the present invention. A light transmissive axis of the first polarizer is parallel to a length of the panel and corresponds to the x-axis in FIG. 8, and a light transmissive axis of the second polarizer is parallel to a width of the panel and corresponds to the y-axis in FIG. 8. An optical axis of the liquid crystal layer is parallel to the light transmissive axis of the second polarizer.

As shown in FIG. 8, a light leakage is decreased at diagonal directions of the panel in the black state. Therefore, the contrast ratio may be improved. A second embodiment of the present invention provides a structure having a better contrast ratio than the first embodiment.

Figure 9:
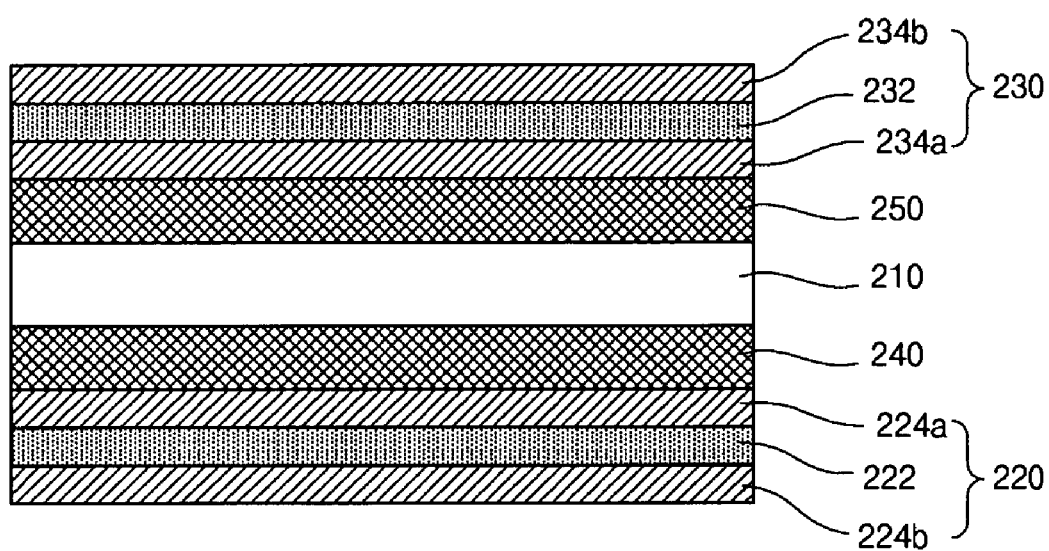
FIG. 9 is a cross-sectional view schematically illustrating an IPS-LCD device according to a second embodiment of the present invention.

FIG. 9 is a cross-sectional view schematically illustrating an IPS-LCD device according to the second embodiment of the present invention. As shown in FIG. 9, the IPS-LCD device includes a liquid crystal panel 210, a first polarizer 220 at a lower surface of the liquid crystal panel 210, and a second polarizer 230 at an upper surface of the liquid crystal panel 210. A first optical compensation film 240 is disposed between the first polarizer 220 and the liquid crystal panel 210, and a second optical compensation film 250 is disposed between the second polarizer 230 and the liquid crystal panel 210.

Similar to the structure of the first embodiment, the liquid crystal panel 210 further includes a first substrate, a second substrate, and a liquid crystal layer interposed between the first and second substrates. The liquid crystal panel 210 is operated in an in-plane switching mode, in which a thin film transistor, a common electrode and a pixel electrode are formed on an inner surface of the first substrate whereas a black matrix and a color filter layer are formed on an inner surface of the second substrate. An overcoat layer may be further formed on the inner surface of the second substrate and cover the black matrix and the color filter layer.

The first polarizer 220 includes first and second protective films 224a and 224b and a first polarizing film 222 between the first and second protective films 224a and 224b. The second polarizer 230 further includes third and fourth protective films 234a and 234b and a second polarizing film 232 between the third and fourth protective films 234a and 234b. Here, the first and second polarizing films 222 and 232 may be formed of polyvinyl alcohol (PVA), and the first, second, third and fourth polarizing films 224a, 224b, 234a and 234b may be formed of triacetylcellulose (TAC). The first and third protective films 224a and 234a adjacent to the liquid crystal panel 210 may be formed of a material having a retardation value of about zero ranging from −10 nanometer to +10 nanometer.

The first and second optical compensation films 240 and 250 may include a +C plate (positive C plate), in which $n_x=n_y<n_z$, wherein $n_x$ is a first refractive index according to the x-direction, $n_y$ is a second refractive index according to the y-direction, $n_z$ is a third refractive index according to the z-direction. The first and second optical compensation films 240 and 250 may have a retardation value less than or equal to $\lambda/4$, wherein $\lambda$ is a wavelength of visible light. The +C plate may be formed by a coating or drawing method.

In the second embodiment of the present invention, the first protective film 224a may include a −C plate having a retardation value. When the first protective film 224a has a retardation value, the retardation value of the first optical compensation film 240 is controlled by the retardation value of the first protective film 224a, to thereby obtain the same effect as the case that the first protective film 224a has a retardation value of about zero ranging from −10 nanometer to +10 nanometer.

Figure 10:
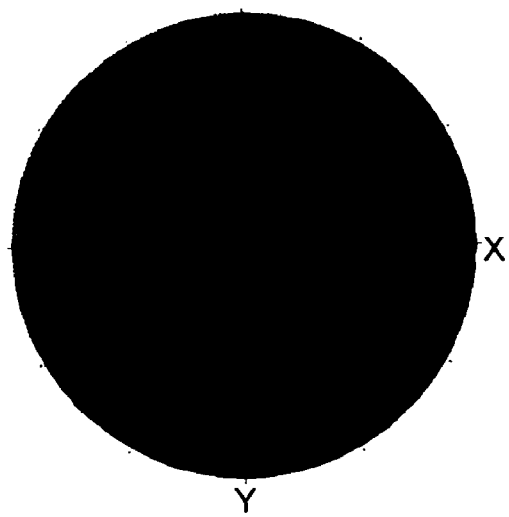
FIG. 10 is a view illustrating simulations of contrast ratios of an IPS-LCD device in a black state according to the second embodiment of the present invention.

FIG. 10 illustrates simulations of contrast ratios of an IPS-LCD device in a black state according to the second embodiment of the present invention. As shown in FIG. 10, the light leakage is minimized at the diagonal directions of the panel in the black state as comparison with the first embodiment. Accordingly, the contrast ratio in the second embodiment is improved more than the first embodiment.

Figure 11:
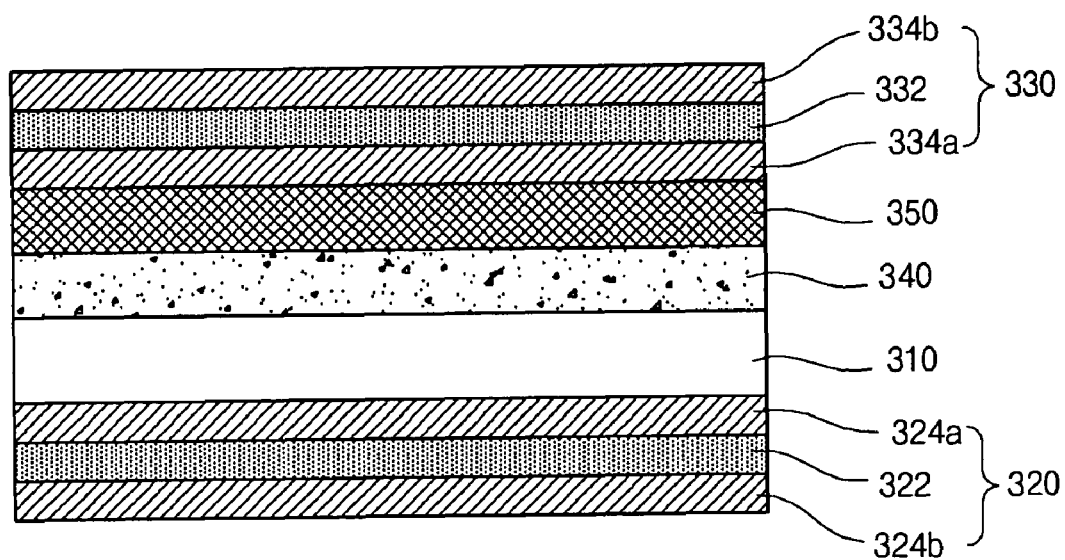
FIG. 11 is a cross-sectional view schematically illustrating an IPS-LCD device according to a third embodiment of the present invention.

FIG. 11 is a cross-sectional view schematically illustrating an IPS-LCD device according to a third embodiment of the present invention. As shown in FIG. 11, the IPS-LCD device includes a liquid crystal panel 310, a first polarizer 320 at a lower surface of the liquid crystal panel 310, and a second polarizer 330 at an upper surface of the liquid crystal panel 310. First and second optical compensation films 340 and 350 are disposed between the liquid crystal panel 310 and the second polarizer 320.

Although not shown in the figure, the liquid crystal panel 310 includes first and second substrates and a liquid crystal layer interposed between the first and second substrates. The liquid crystal panel 310 is operated in an in-plane switching mode, in which a thin film transistor, a common electrode and a pixel electrode are formed on an inner surface of the first substrate whereas a black matrix and a color filter layer are formed on an inner surface of the second substrate. An overcoat layer may be further formed on the inner surface of the second substrate and cover the black matrix and the color filter layer.

The first polarizer 320 further includes first and second protective films 324a and 324b and a first polarizing film 322 between the first and second protective films 324a and 324b. The second polarizer 330 includes third and fourth protective films 334a and 334b and a second polarizing film 332 between the third and fourth protective films 334a and 334b. The first and second polarizing films 322 and 332 may be formed of polyvinyl alcohol (PVA), and the first, second, third and fourth polarizing films 324a, 324b, 334a and 334b may be formed of triacetylcellulose (TAC). The first and third protective films 324a and 334a adjacent to the liquid crystal panel 310 may be formed of a material having a retardation value of about zero ranging from −10 nanometer to +10 nanometer.

The first optical compensation film 340 may include a +C plate (positive C plate), in which $n_x=n_y<n_z$, wherein $n_x$ is a first refractive index according to the x-direction, $n_y$ is a second refractive index according to the y-direction, $n_z$ is a third refractive index according to the z-direction. The +C plate may be formed by a coating or drawing method.

The second optical compensation film 350 may include an A plate, in which $n_x \neq n_y=n_z$. In addition, an optical axis of the A plate may be parallel with or perpendicular to a rubbing direction of the liquid crystal layer (i.e., an optical axis of the liquid crystal layer). The optical axis of the liquid crystal layer is parallel with a light transmissive axis of the second polarizer 330 and is perpendicular to a light transmissive axis of the first polarizer 320. The light transmissive axis of the first polarizer 320 may be parallel to a length of the liquid crystal panel 310, and the light transmissive axis of the second polarizer 330 may be parallel to a width of the liquid crystal panel 310.

In the third embodiment of the present invention, to prevent light leakages in different viewing angles, the first optical compensation film 340, which is a +C plate, may have a phase retardation value less than or equal to $\lambda/4$, wherein $\lambda$ is a wavelength of visible light. The liquid crystal layer of the liquid crystal panel 310 may have a phase retardation value more than or equal to $\lambda/4$, and less than $\lambda$. Further, the second optical compensation film 350, which is an A plate, may have a phase retardation value more than or equal to $\lambda/4$, and less than $\lambda$.

In the third embodiment of the present invention, the first protective film 324a may have a retardation value. In this case, the first protective film 324a may include a −C plate. When the first protective film 324a has a retardation value, the retardation values of the first and second optical compensation films 340 and 350 can be controlled by the retardation value of the first protective film 324a.

Figure 12:
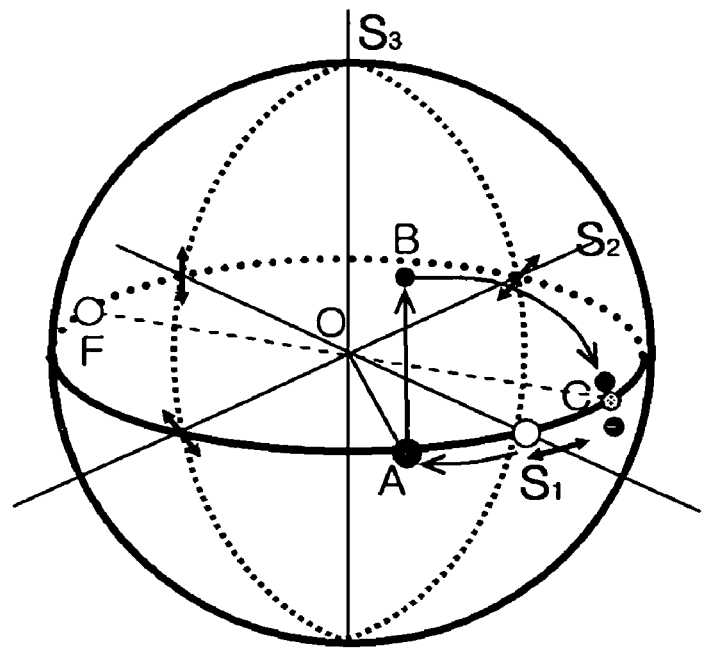
FIG. 12 is a view illustrating a Poincare sphere showing polarization states of light that passes through optical elements of an IPS-LCD device according to the third embodiment of the present invention.

FIG. 12 illustrates a Poincare sphere showing polarization states of light passing through optical elements of an IPS-LCD device of FIG. 11. The Poincare sphere represents polarization states of light on a spherical surface. The Poincare sphere is widely used for designing compensation films because polarization states are easily predicted by using the Poincare sphere if optical axes and phase retardation values of the optical elements are known.

In the Poincare sphere, the equator designates the linear polarization, the polar point S3 designates the left handed circular polarization, the polar point −S3 designates the right handed circular polarization, the upper hemisphere designates the left handed elliptical polarization, and the lower hemisphere designates right handed elliptical polarization.

In FIG. 12, when the IPS-LCD device of the present invention is observed from the front, the point S1 on the equator designates a polarization state of the first polarizer, and the point −S1 designates a polarization state of the second polarizer. The polarization states of the first and second polarizers are symmetrical with respect to the center O of the Poincare sphere. Thus, the polarization states of the first and second polarizers are perpendicular to each other, to thereby generate the perfect black state.

On the other hand, when the IPS-LCD device is observed from the side, the polarization state of the first polarizer is observed on the point A on the equator, and the polarization state of the second polarizer is observed on the point F. The point A and the point F are not symmetrical with respect to the center O, so that the polarization states of the first and second polarizers are not perpendicular to each other. Accordingly, a polarization state of light reaching the second polarizer becomes perpendicular to the polarization state of the second polarizer due to optical compensation films.

As shown in FIG. 12, when the IPS-LCD device according to the third embodiment of the present invention is observed from the side, the polarization states of light passing through optical elements are changed from the point A into the point B due to the first optical compensation film 340 of FIG. 11, a +C plate, and then are changed from the point B into the point C due to the second optical compensation film 350 of FIG. 11, an A plate. The point C moved by the optical films is symmetrical to the point F with respect to the center O. Therefore, the polarization state on the point C, which corresponds to light reaching the second polarizer, is perpendicular to the polarization state of the second polarizer. In turn, light is blocked, thereby generating a good black state.

As described above, a light leakage is prevented in the third embodiment of the present invention, by controlling polarization states using a +C plate and an A plate. As a result, the contrast ratio is improved.

However, because the +C plate and the A plate have different phase retardation values depending upon the wavelengths of light, R, G, and B lights rotating differently, polarization states for the R, G, and B lights reaching the second polarizer are not coincident with the point C. Therefore, color shift occurs in different viewing angles in the IPS-LCD device.

Figure 13:
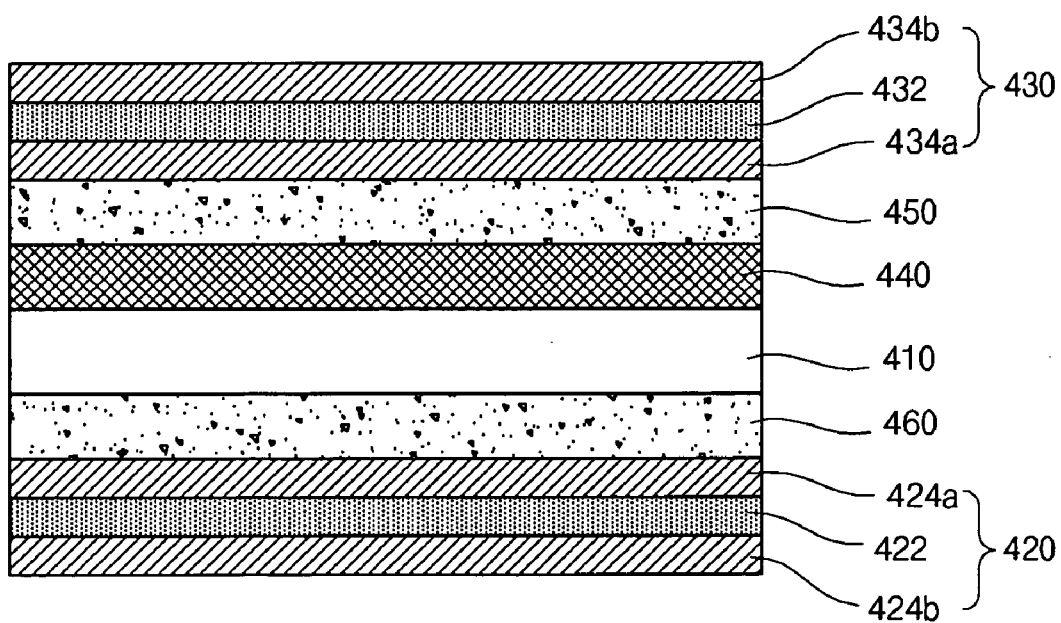
FIG. 13 is a cross-sectional view illustrating an IPS-LCD device according to a fourth embodiment of the present invention.

FIG. 13 is a cross-sectional view illustrating an IPS-LCD device according to a fourth embodiment of the present invention. The fourth embodiment of the present invention is to provide an IPS LCD device having both improved contrast ratio and color shift.

As shown in FIG. 13, the IPS-LCD device includes a liquid crystal panel 410, a first polarizer 420 at a lower surface of the liquid crystal panel 410, and a second polarizer 430 at an upper surface of the liquid crystal panel 410. First and second optical compensation films 440 and 450 are sequentially disposed between the liquid crystal panel 410 and the second polarizer 420, while a third optical compensation film 460 is disposed between the liquid crystal panel 410 and the first polarizer 420.

Although not shown in the figure, the liquid crystal panel 410 includes a first substrate, a second substrate, and a liquid crystal layer interposed between the first and second substrates. The liquid crystal panel 410 is operated in an in-plane switching mode, in which a thin film transistor, a common electrode and a pixel electrode are formed on an inner surface of the first substrate, while a black matrix and a color filter layer are formed on an inner surface of the second substrate. An overcoat layer may be further formed on the inner surface of the second substrate and cover the black matrix and the color filter layer.

The first polarizer 420 further includes first and second protective films 424a and 424b and a first polarizing film 422 between the first and second protective films 424a and 424b. Similarly, the second polarizer 430 includes third and fourth protective films 434a and 434b and a second polarizing film 432 between the third and fourth protective films 434a and 434b. For example, the first and second polarizing films 422 and 432 may be formed of polyvinyl alcohol (PVA), and the first, second, third and fourth polarizing films 424a, 424b, 434a and 434b may be formed of triacetylcellulose (TAC). The first and third protective films 424a and 434a adjacent to the liquid crystal panel 410 may be formed of a material having a retardation value of about zero ranging from −10 nanometer to +10 nanometer.

The first optical compensation film 440 may include an A plate, in which $n_x \neq n_y = n_z$, wherein $n_x$ is a first refractive index according to the x-direction, $n_y$ is a second refractive index according to the y-direction, $n_z$ is a third refractive index according to the z-direction. An optical axis of the A plate may be parallel with or perpendicular to a rubbing direction of the liquid crystal layer (i.e., an optical axis of the liquid crystal layer). The optical axis of the liquid crystal layer is parallel with a light transmissive axis of the second polarizer 430 and is perpendicular to a light transmissive axis of the first polarizer 420. The light transmissive axis of the first polarizer 420 may be parallel to a length of the liquid crystal panel 410, and the light transmissive axis of the second polarizer 430 may be parallel to a width of the liquid crystal panel 410. The second and third optical compensation films 450 and 460 may include a +C plate (positive C plate), in which $n_x = n_y < n_z$. The +C plate may be formed by a coating or drawing method.

In the fourth embodiment of the present invention, to prevent light leakages in different viewing angles, the second and third optical compensation films 450 and 460, which are +C plates, may have a phase retardation value less than or equal to $\lambda/4$, wherein $\lambda$ is a wavelength of visible light, the liquid crystal layer of the liquid crystal panel 410 may have a phase retardation value more than or equal to $\lambda/4$, and less than $\lambda$, and the first optical compensation film 440, which is an A plate, may have a phase retardation value more than or equal to $\lambda/4$, and less than $\lambda$.

Figure 14:
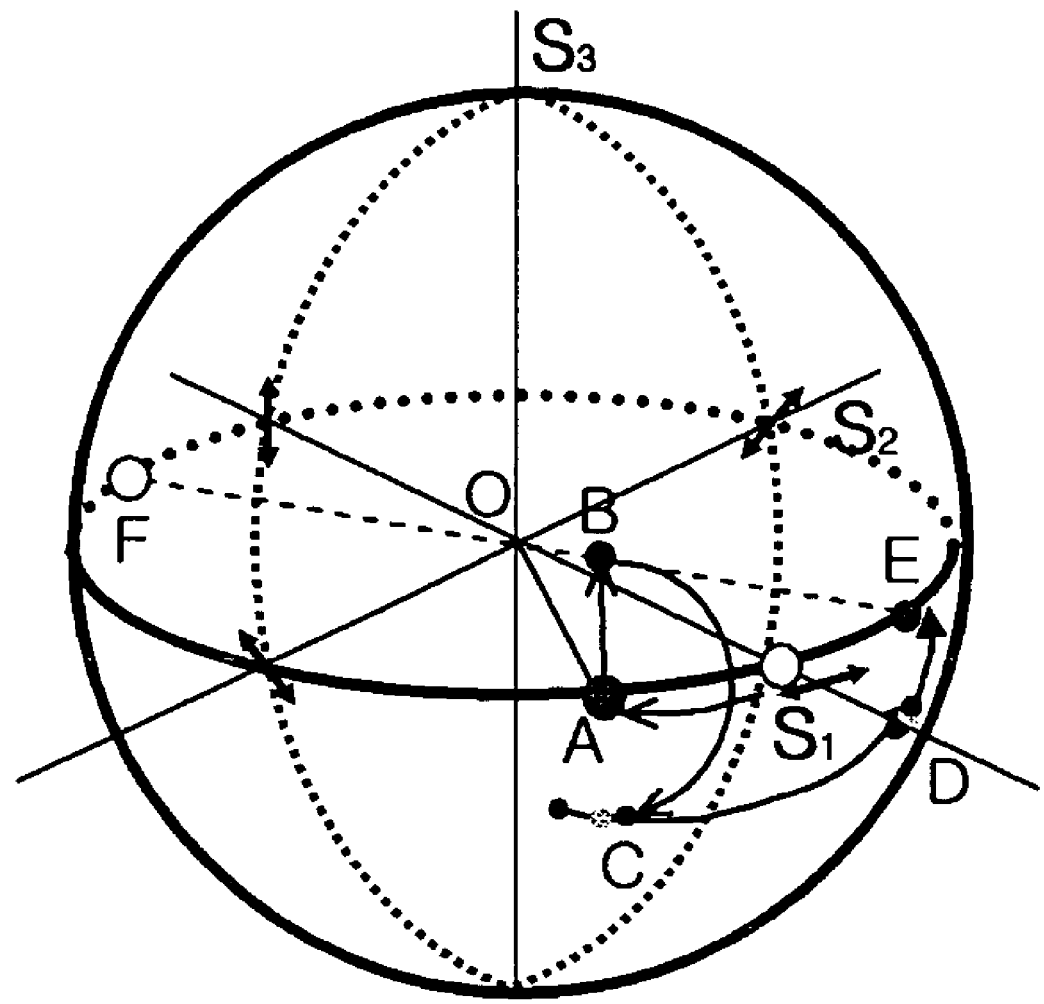
FIG. 14 is a view illustrating a Poincare sphere showing polarization states of light that passes through optical elements of an IPS-LCD device according to the fourth embodiment of the present invention.

FIG. 14 illustrates a Poincare sphere showing polarization states of light passing through optical elements of an IPS-LCD device of FIG. 13. As shown in FIG. 14, when the IPS-LCD device is observed from the side, the polarization state of the first polarizer is shown on the point A on the equator, and the polarization state of the second polarizer is shown on the point F. The polarization states of light passing through the IPS-LCD device are changed from the point A into the point B due to the third optical compensation film 460 of FIG. 13, a +C plate, and then are changed from the point B into the point C due to the liquid crystal layer of the liquid crystal panel 410 of FIG. 13.

In turn, the polarization states of the light are changed from the point C into the point D due to the first optical compensation film 440 of FIG. 13, an A plate. The phase differences in different wavelengths are compensated by the first optical compensation film 440 of FIG. 13, and thus the polarization states of R, G and B lights are nearly coincident at the point D. Then, the polarization states of the R, G and B lights are changed from the point D into the point E due to the second optical compensation film 450 of FIG. 13, the +C plate. The point E moved by the optical films is symmetrical to the point F with respect to the center O. Thus, the polarization states of lights for almost every wavelength are disposed at one point. Therefore, the polarization state on the point D, which corresponds to light reaching the second polarizer, is perpendicular to the polarization state of the second polarizer. As a result, light is blocked, thereby increasing the contrast ratio. In addition, there occurs a relatively little color shift, so that viewing angles are improved.

As described above, in embodiments of the present invention, the protective films adjacent to the liquid crystal panel have a retardation value of about zero ranging from −10 nanometer to +10 nanometer, and a +C plate is used as the compensation film. Therefore, the light leakage is prevented in a black state, and the contrast ratio is improved. Moreover, by using an A plate in addition, the color shift and the viewing angles are improved in the IPS LCD device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:
   a liquid crystal display panel having first and second substrates and a liquid crystal layer therebetween, wherein pixel and common electrodes are formed on an inner surface of the first substrate;
   a first polarizer disposed over an outer surface of the first substrate of the liquid crystal display panel and having a first protective film, a first polarizing film, and a second protective film;
   a second polarizer disposed over an outer surface of the second substrate of the liquid crystal display panel and having a third protective film, a second polarizing film, and a fourth protective film; and
   a first optical compensation film between the first polarizer and the liquid crystal display panel, the third protective film being adjacent to the liquid crystal display panel and having a retardation value ranging from −10 nanometers to +10 nanometers in the thickness direction,
   wherein the third protective film is formed of triacetylcellulose.

2. The device according to claim 1, wherein the first protective film is adjacent to the liquid crystal display panel and has a retardation value ranging from −10 nanometers to +10 nanometers.

3. The device according to claim 1, wherein the first, second, and fourth protective films are formed of triacetylcellulose.

4. The device according to claim 1, wherein the first optical compensation film includes a +C plate, in which $n_x=n_y<n_z$, wherein $n_x$ is a first refractive index according to an x-direction, $n_y$ is a second refractive index according to a y-direction, $n_z$ is a third refractive index according to a z-direction.

5. The device according to claim 4, wherein the +C plate has a retardation value less than or equal to $\lambda/2$, wherein $\lambda$ is a wavelength of visible light.

6. The device according to claim 5, wherein the first protective film includes a −C plate, in which $n_x=n_y>n_z$ wherein $n_x$ is a first refractive index according to an x-direction, $n_y$ is a second refractive index according to a y-direction, $n_z$ is a third refractive index according to a z-direction.

7. The device according to claim 1, further comprising a second optical compensation film between the second polarizer and the liquid crystal display panel.

8. The device according to claim 7, wherein the first and second optical compensation films include a +C plate, in which $n_x=n_y<n_z$, wherein $n_x$ is a first refractive index according to an x-direction, $n_y$ is a second refractive index according to a y-direction, $n_z$ is a third refractive index according to a z-direction.

9. The device according to claim 8, wherein the +C plate has a retardation value less than or equal to $\lambda/4$, wherein $\lambda$ is a wavelength of visible light.

10. The device according to claim 1, wherein the first protective film includes a −C plate, in which $n_x=n_y>n_z$ wherein $n_x$ is a first refractive index according to an x-direction, $n_y$ is a second refractive index according to a y-direction, $n_z$ is a third refractive index according to a z-direction.

11. The device according to claim 1, wherein the first polarizing film is interposed between the first and second protective films.

12. The device according to claim 1, wherein the second polarizing film is interposed between the third and fourth protective films.

13. The device according to claim 1, further comprising:
   a second optical compensation film between the liquid crystal panel and the second polarizer; and
   a third optical compensation film between the second optical compensation film and the second polarizer.

14. The device according to claim 13, wherein the first protective film is adjacent to the liquid crystal display panel and has a retardation value ranging from −10 nanometers to +10 nanometers.

15. The device according to claim 13, wherein the first, second, third, and fourth protective films are formed of triacetylcellulose.

16. The device according to claim 13, wherein the second optical compensation film includes an A plate, in which $n_x \neq n_y = n_z$, and the first and third optical compensation films include a +C plate, in which $n_x=n_y<n_z$, wherein $n_x$ is a first refractive index according to an x-direction, $n_y$ is a second refractive index according to a y-direction, $n_z$ is a third refractive index according to a z-direction.

17. The device according to claim 16, wherein the A plate has an optical axis perpendicular to an optical axis of the liquid crystal layer.

18. The device according to claim 16, wherein the +C plate has a retardation value less than or equal to $\lambda/4$, wherein $\lambda$ is a wavelength of visible light, and the liquid crystal layer and the A plate have retardation values more than or equal to $\lambda/4$ and less than $\lambda$.

19. The device according to claim 13, wherein the first protective film includes a −C plate, in which $n_x=n_y>n_z$, wherein $n_x$ is a first refractive index according to an x-direction, $n_y$ is a second refractive index according to a y-direction, $n_z$ is a third refractive index according to a z-direction.

20. The device according to claim 13, wherein the first polarizing film is interposed between the first and second protective films.

21. The device according to claim 13, wherein the second polarizing film is interposed between the third and fourth protective films.

22. A method of fabricating an in-plane switching liquid crystal display device, comprising:
   forming a liquid crystal display panel having first and second substrates and a liquid crystal layer between, wherein pixel and common electrodes are formed on an inner surface of the first substrate;
   forming a first polarizer over an outer surface of the first substrate of the liquid crystal display panel, the first polarizer having a first protective film, a first polarizing film, and a second protective film;
   forming a second polarizer over an outer surface of the second substrate of the liquid crystal display panel, the second polarizer having a third protective film, a second polarizing film, and a fourth protective film; and forming a first optical compensation film between the first polarizer and the liquid crystal display panel, the third protective film being adjacent to the liquid crystal display panel and having a retardation value ranging from −10 nanometers to +10 nanometers in the thickness direction, wherein the third protective film is formed of triacetylcellulose.

23. The method according to claim 22, wherein the first protective film is formed to be adjacent to the liquid crystal display panel and has a retardation value ranging from −10 nanometers to +10 nanometers.

24. The method according to claim 22, wherein the first, second, and fourth protective films are formed of triacetylcellulose.

25. The method according to claim 22, wherein the first optical compensation film includes a +C plate, in which $n_x=n_y<n_z$, wherein $n_x$ is a first refractive index according to an x-direction, $n_y$ is a second refractive index according to a y-direction, $n_z$ is a third refractive index according to a z-direction.

26. The method according to claim 25, wherein the +C plate has a retardation value less than or equal to $\lambda/2$, wherein $\lambda$ is a wavelength of visible light.

27. The method according to claim 26, wherein the first protective film includes a −C plate, in which $n_x=n_y>n_z$ wherein $n_x$ is a first refractive index according to an x-direction, $n_y$ is a second refractive index according to a y-direction, nz is a third refractive index according to a z-direction.

28. The method according to claim 22, further comprising forming a second optical compensation film between the second polarizer and the liquid crystal display panel.

29. The method according to claim 28, wherein the first and second optical compensation films include a +C plate, in which $n_x=n_y<n_z$, wherein $n_x$ is a first refractive index according to an x-direction, $n_y$ is a second refractive index according to a y-direction, $n_z$ is a third refractive index according to a z-direction.

30. The method according to claim 29, wherein the +C plate has a retardation value less than or equal to $\lambda/4$, wherein $\lambda$ is a wavelength of visible light.

31. The method according to claim 22, wherein the first protective film includes a −C plate, in which $n_x=n_y>n_z$ wherein $n_x$ is a first refractive index according to an x-direction, $n_y$ is a second refractive index according to a y-direction, $n_z$ is a third refractive index according to a z-direction.

32. The method according to claim 22, wherein the first polarizing film is formed between the first and second protective films.

33. The method according to claim 22, wherein the second polarizing film is formed between the third and fourth protective films.

34. The method according to claim 22, further comprising:
   forming a second optical compensation film between the liquid crystal panel and the second polarizer; and
   forming a third optical compensation film between the second optical compensation film and the second polarizer, the third protective film being adjacent to the liquid crystal panel and having a substantially zero retardation value.

35. The method according to claim 34, wherein the first protective film is formed to be adjacent to the liquid crystal display panel and has a substantially zero retardation value retardation value ranging from −10 nanometers to +10 nanometers.

36. The method according to claim 34, wherein the first, second, third, and fourth protective films are formed of triacetylcellulose.

37. The method according to claim 34, wherein the second optical compensation film includes an A plate, in which $n_x \neq n_y = n_z$, and the first and third optical compensation films include a +C plate, in which $n_x=n_y<n_z$, wherein $n_x$ is a first refractive index according to an x-direction, $n_y$ is a second refractive index according to a y-direction, $n_z$ is a third refractive index according to a z-direction.

38. The method according to claim 37, wherein the A plate has an optical axis perpendicular to an optical axis of the liquid crystal layer.

39. The method according to claim 37, wherein the +C plate has a retardation value less than or equal to $\lambda/4$, wherein $\lambda$ is a wavelength of visible light, and the liquid crystal layer and the A plate have retardation values more than or equal to $\lambda/4$, and less than $\lambda$.

40. The method according to claim 34, wherein the first protective film includes a −C plate, in which $n_x=n_y>n_z$, wherein $n_x$ is a first refractive index according to an x-direction, $n_y$ is a second refractive index according to a y-direction, $n_z$ is a third refractive index according to a z-direction.

41. The method according to claim 34, wherein the first polarizing film is formed between the first and second protective films.

42. The method according to claim 34, wherein the second polarizing film is formed between the third and fourth protective films.

* * * * *